Oct. 28, 1958 E. GOLDMAN 2,857,601
FASTENER FOR CAP GROMMET
Filed Dec. 1, 1953
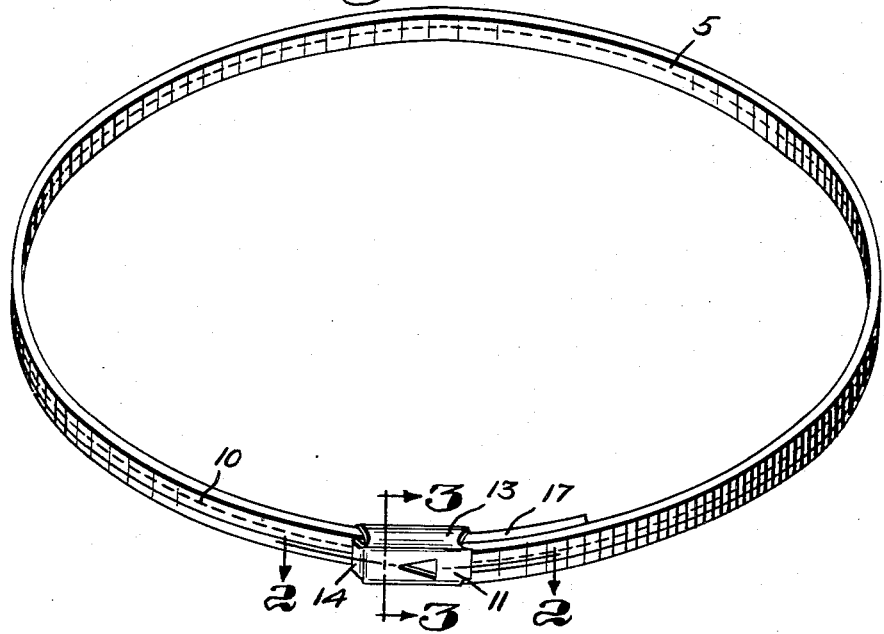
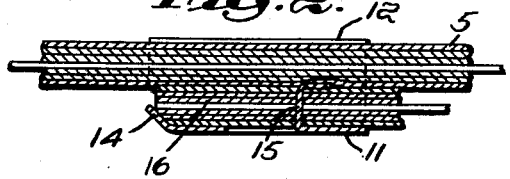
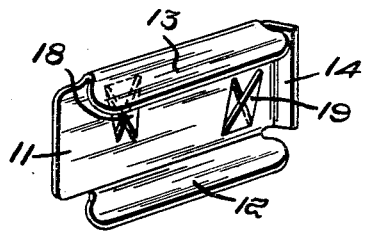
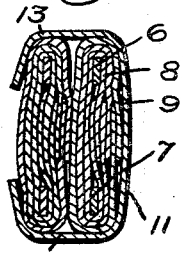
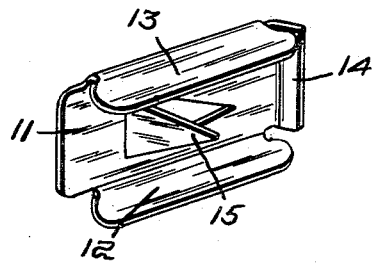
Inventor:
Edward Goldman,
by Thomson & Thomson
Attorney

2,857,601

FASTENER FOR CAP GROMMET

Edward Goldman, Saxonville, Mass., assignor to Bancroft Cap Company, Framingham, Mass., a corporation of Massachusetts Application December 1, 1953, Serial No. 395,333

3 Claims. (Cl. 2—199)

This invention relates to grommets for supporting men's uniform caps and the like, and more particularly to a fastening device for adjustable grommets.

The object of the invention is to provide a fastener for an adjustable cap grommet which securely grips one end of the grommet and is slidable over the other end, which produces a smooth outer joint in the grommet and which is simple and inexpensive to manufacture.

In the drawings illustrating the invention:

Fig. 1 is a perspective view of a grommet employing a fastener constructed according to the invention;

Fig. 2 is an enlarged cross-section along line 2—2 of Fig. 1;

Fig. 3 is an enlarged cross-section along line 3—3 of Fig. 1;

Fig. 4 is an enlarged perspective view of the fastener before assembly on the grommet; and Fig. 5 is an enlarged perspective view of a modification of the fastener.

The grommet 5 is of a conventional type used to stiffen circular topped cloth caps, and consists of a strip formed from a pair of wires 6 and 7 enclosed in one or more layers 8 of padding and encased in an outer cover 9 of cloth or plastic. The assembled strip is stitched along line 10. The fastener is made of metal and has a rigid back 11 connected to a pair of flaps 12 and 13 which are bent over as shown in Fig. 3 to form a channel of a depth about twice the thickness of the strip, a sloping lip 14 on one end of the fastener projects over the outer end of the grommet strip and forms a smooth joint on the outside which is not conspicuous through the material of the cap.

A V-shaped barb 15 is cut out from the back 11 and is driven through the strip and crimped over as shown in Fig. 2. When the fastener is assembled on the grommet strip the outer end 16 of the grommet strip is fixed to the fastener and the overlapping inner end 17 is slidable between flaps 12 and 13.

In the modification of Fig. 5, two barbs are provided in the back 11 of the fastener. The upper barb 18 is crimped upward around wire 6, and the lower barb 19 is crimped downward around wire 7. If preferred, the fastener may also be secured to the grommet by means of a rivet driven through back 11.

What is claimed is:

1. The combination of a cap grommet, of the type composed of a strip having spaced upper and lower stiffening wires enclosed in a flexible casing, the strip being formed in a loop having an outer end overlapping an inner end portion with a fastener, comprising: a backer piece disposed against the outside of the strip adjacent said outer end, having an inwardly sloping extension overlying said outer end across the entire width of the strip to form a smooth junction of the outer end with the strip adjacent the overlapped portion; a barb formed from said back piece, projecting into the casing between the wires in the region adjacent the outer end and securing the back piece to the strip in said region; and a pair of flaps projecting inward from said back piece to form a channel of a depth substantially equal to twice the thickness of the strip, said flaps having margins bent around the overlapped portion of the strip and holding said portion in sliding frictional engagement with said outer end.

2. The combination of a cap grommet, of the type composed of a strip having spaced upper and lower stiffening wires enclosed in a flexible casing, the strip being formed in a loop having an outer end overlapping an inner end portion with a fastener, comprising: a backer piece disposed against the outside of the strip adjacent said outer end, having an inwardly slopping extension overlying said outer end across the entire width of the strip to form a smooth junction of the outer end with the strip adjacent the overlapped portion; a V-shaped barb formed from said back piece and clinched in said casing in the region between the wires near said outer end thereby securing the fastener to the strip in said region; and a pair of flaps projecting inward from said back piece to form a channel of a depth substantially equal to twice the thickness of the strip, said flaps having margins bent around the overlapped portion of the strip and holding said portion in sliding frictional engagement with said outer end.

3. The combination of a cap grommet, of the type composed of a strip having spaced upper and lower stiffening wires enclosed in a flexible casing, the strip being formed in a loop having an outer end overlapping an inner end portion with a fastener, comprising: a backer piece disposed against the outside of the strip adjacent said outer end, having an inwardly sloping extension overlying said outer end across the entire width of the strip to form a smooth junction of the outer end with the strip adjacent the overlapped portion; a pair of V-shaped barbs formed from said back piece, entering said casing between the wires, and clinched one around the upper wire and one around the lower wire in the region of the strip adjacent said outer end, thereby securing the fastener to the strip in said region; and a pair of flaps projecting inward from said back piece to form a channel of a depth substantially equal to twice the thickness of the strip, said flaps having margins bent around the overlapped portion of the strip and holding said portion in sliding frictional engagement with said outer end.

References Cited in the file of this patent

UNITED STATES PATENTS

| | | |
|---|---|---|
| 308,915 | Meaker | Dec. 9, 1884 |
| 711,949 | Dollison | Oct. 28, 1902 |
| 1,019,445 | Feid | Mar. 5, 1912 |
| 1,168,657 | Lorraine | Jan. 18, 1916 |
| 1,457,386 | Myers | June 5, 1923 |
| 1,704,422 | Belunes | Mar. 5, 1929 |
| 1,708,470 | Eckert | Apr. 9, 1929 |
| 2,495,029 | Spengler | Jan. 17, 1950 |
| 2,632,934 | Thompson | Mar. 31, 1953 |

FOREIGN PATENTS

| | | |
|---|---|---|
| 478,941 | Great Britain | Jan. 27, 1938 |
| 507,681 | Germany | Dec. 24, 1929 |